(12) United States Patent
Kirmayer

(10) Patent No.: US 8,593,824 B2
(45) Date of Patent: Nov. 26, 2013

(54) TAMPER SECURE CIRCUITRY ESPECIALLY FOR POINT OF SALE TERMINAL

(75) Inventor: Ehud Kirmayer, Moshav (IL)

(73) Assignee: Verifone, Inc., San Jose, CA (US)

( * ) Notice: Subject to any disclaimer, the term of this patent is extended or adjusted under 35 U.S.C. 154(b) by 360 days.

(21) Appl. No.: 12/913,394

(22) Filed: Oct. 27, 2010

(65) Prior Publication Data

US 2012/0106113 A1    May 3, 2012

(51) Int. Cl.
| | |
|---|---|
| *H05K 7/00* | (2006.01) |
| *H05K 1/00* | (2006.01) |
| *H05K 1/14* | (2006.01) |
| *H02B 1/00* | (2006.01) |

(52) U.S. Cl.
USPC ........... 361/760; 361/672; 361/748; 361/779; 361/782; 361/784

(58) Field of Classification Search
USPC ......... 361/672, 748, 760, 763, 764, 779, 782, 361/784
See application file for complete search history.

(56) References Cited

U.S. PATENT DOCUMENTS

| | | |
|---|---|---|
| 3,466,643 A | 9/1969 | Moorefield |
| 3,735,353 A | 5/1973 | Donovan et al. |
| 3,818,330 A | 6/1974 | Hiroshima et al. |
| 4,486,637 A | 12/1984 | Chu |
| 4,527,030 A | 7/1985 | Oelsch |
| 4,593,384 A | 6/1986 | Kleijne |
| 4,749,368 A | 6/1988 | Mouissie |
| 4,807,284 A | 2/1989 | Kleijne |
| 4,847,595 A | 7/1989 | Okamoto |
| 5,086,292 A | 2/1992 | Johnson et al. |
| 5,237,307 A | 8/1993 | Gritton |
| 5,239,664 A | 8/1993 | Verrier et al. |
| 5,353,350 A | 10/1994 | Unsworth et al. |
| 5,406,630 A * | 4/1995 | Piosenka et al. ................. 380/52 |
| 5,506,566 A | 4/1996 | Oldfield et al. |
| 5,559,311 A | 9/1996 | Gorbatoff |
| 5,586,042 A | 12/1996 | Pisau et al. |
| 5,627,520 A | 5/1997 | Grubbs et al. |
| 5,675,319 A | 10/1997 | Rivenberg et al. |
| 5,861,662 A | 1/1999 | Candelore |

(Continued)

FOREIGN PATENT DOCUMENTS

| | | |
|---|---|---|
| DE | 2 241 738 | 8/1974 |
| DE | 601 01 096 | 7/2004 |

(Continued)

OTHER PUBLICATIONS

An International Preliminary Report on Patentability dated Jul. 19, 2011 which issued during the prosecution of Applicant's PCT/IL2009/000724.

(Continued)

*Primary Examiner* — Jeremy Norris
*Assistant Examiner* — Sherman Ng
(74) *Attorney, Agent, or Firm* — Sughrue Mion, PLLC

(57) ABSTRACT

Tamper secure circuitry including a first printed circuit board having mounted thereon circuit components and a slotted anti-tamper grid containing printed circuit board mounted onto the first printed circuit board defining at least one slot and arranged to overlie at least some of the circuit components, which are located in a volume defined by the at least one slot and the first printed circuit board.

29 Claims, 1 Drawing Sheet

(56) References Cited

U.S. PATENT DOCUMENTS

| | | | |
|---|---|---|---|
| 5,877,547 A | 3/1999 | Rhelimi | |
| 5,956,576 A * | 9/1999 | Toy et al. | 438/125 |
| 5,998,858 A | 12/1999 | Little et al. | |
| 6,288,640 B1 | 9/2001 | Gagnon | |
| 6,359,338 B1 | 3/2002 | Takabayashi | |
| 6,396,400 B1 | 5/2002 | Epstein, III et al. | |
| 6,414,884 B1 | 7/2002 | Defelice et al. | |
| 6,438,825 B1 | 8/2002 | Kuhn | |
| 6,463,263 B1 | 10/2002 | Feilner et al. | |
| 6,466,118 B1 | 10/2002 | Van Zeeland et al. | |
| 6,563,488 B1 | 5/2003 | Rogers et al. | |
| 6,646,565 B1 * | 11/2003 | Fu et al. | 340/687 |
| 6,669,100 B1 | 12/2003 | Rogers et al. | |
| 6,830,182 B2 | 12/2004 | Izuyama | |
| 6,853,093 B2 * | 2/2005 | Cohen et al. | 257/678 |
| 6,874,092 B1 | 3/2005 | Motoyama et al. | |
| 6,912,280 B2 | 6/2005 | Henry | |
| 6,917,299 B2 | 7/2005 | Fu et al. | |
| 6,921,988 B2 | 7/2005 | Moree | |
| 6,936,777 B1 | 8/2005 | Kawakubo | |
| 7,170,409 B2 | 1/2007 | Ehresvard et al. | |
| 7,270,275 B1 | 9/2007 | Moreland et al. | |
| 7,283,066 B2 | 10/2007 | Shipman | |
| 7,497,378 B2 | 3/2009 | Aviv | |
| 7,784,691 B2 | 8/2010 | Mirkazemi-Moud et al. | |
| 7,843,339 B2 | 11/2010 | Kirmayer | |
| 7,898,413 B2 | 3/2011 | Hsu et al. | |
| 2004/0031673 A1 | 2/2004 | Levy | |
| 2004/0118670 A1 | 6/2004 | Park et al. | |
| 2004/0120101 A1 | 6/2004 | Cohen et al. | |
| 2005/0081049 A1 | 4/2005 | Nakayama et al. | |
| 2005/0184870 A1 | 8/2005 | Galperin et al. | |
| 2006/0049255 A1 | 3/2006 | Von Mueller et al. | |
| 2006/0049256 A1 | 3/2006 | Von Mueller et al. | |
| 2006/0192653 A1 | 8/2006 | Atkinson et al. | |
| 2007/0018334 A1 * | 1/2007 | Peytavy et al. | 257/778 |
| 2007/0038865 A1 * | 2/2007 | Oggioni et al. | 713/178 |
| 2007/0040674 A1 | 2/2007 | Hsu | |
| 2007/0102272 A1 | 5/2007 | Sano et al. | |
| 2007/0152042 A1 | 7/2007 | Mittler | |
| 2007/0204173 A1 | 8/2007 | Kuhn | |
| 2008/0135617 A1 | 6/2008 | Aviv | |
| 2008/0180245 A1 * | 7/2008 | Hsu et al. | 340/571 |
| 2008/0278217 A1 * | 11/2008 | Hankhofer et al. | 327/509 |
| 2008/0278353 A1 | 11/2008 | Smith et al. | |
| 2009/0058628 A1 | 3/2009 | Kirmayer | |
| 2009/0184850 A1 | 7/2009 | Schulz et al. | |
| 2011/0063109 A1 | 3/2011 | Ostermöller | |
| 2011/0215938 A1 | 9/2011 | Neo et al. | |
| 2011/0248860 A1 | 10/2011 | Avital et al. | |
| 2012/0106113 A1 | 5/2012 | Kirmayer et al. | |
| 2012/0180140 A1 | 7/2012 | Barrowman | |

FOREIGN PATENT DOCUMENTS

| | | |
|---|---|---|
| EP | 0 375 545 | 6/1990 |
| EP | 1421549 | 5/2004 |
| EP | 1 432 031 | 6/2004 |
| EP | 03257680 | 6/2004 |
| EP | 1676182 | 7/2006 |
| FR | 2911000 | 7/2008 |
| GB | 892198 | 3/1962 |
| GB | 1 369 739 | 10/1974 |
| GB | 8608277 | 5/1986 |
| GB | 2372363 | 8/2002 |
| GB | 2411756 | 9/2005 |
| JP | 2002108711 | 4/2002 |
| JP | 2003100169 | 4/2003 |
| WO | 2005/086546 | 2/1992 |
| WO | 01/63994 | 8/2001 |
| WO | WO 03/019467 | 3/2003 |
| WO | WO 2005/041002 | 5/2005 |
| WO | 2009/091394 | 7/2009 |
| WO | WO 2010/082190 | 7/2010 |

OTHER PUBLICATIONS

A Notice of Allowance dated Sep. 10, 2010, which issued during the prosecution of Applicant's U.S. Appl. No. 11/845,435.

Van Ess, Dave; "Capacitive touch switches for automotive applications", http://www.automotivedesignline.com/, Feb. 2006.

Victor Kremin, et al., "Capacitive sensing—waterproof capacitance sensing", Cypress Perform, Dec. 2006.

An Office Action dated Oct. 26, 2004, which issued during the prosecution of U.S. Appl. No. 10/326,726.

An Office Action dated May 28, 2004, which issued during the prosecution of U.S. Appl. No. 10/326,726.

An Office Action dated Apr. 10, 2012, which issued during the prosecution of U.S. Appl. No. 12/758,150.

An International Search Report and a Written Opinion both dated Apr. 30, 2012, which issued during the prosecution of Applicant's PCT/US2012/020142.

* cited by examiner

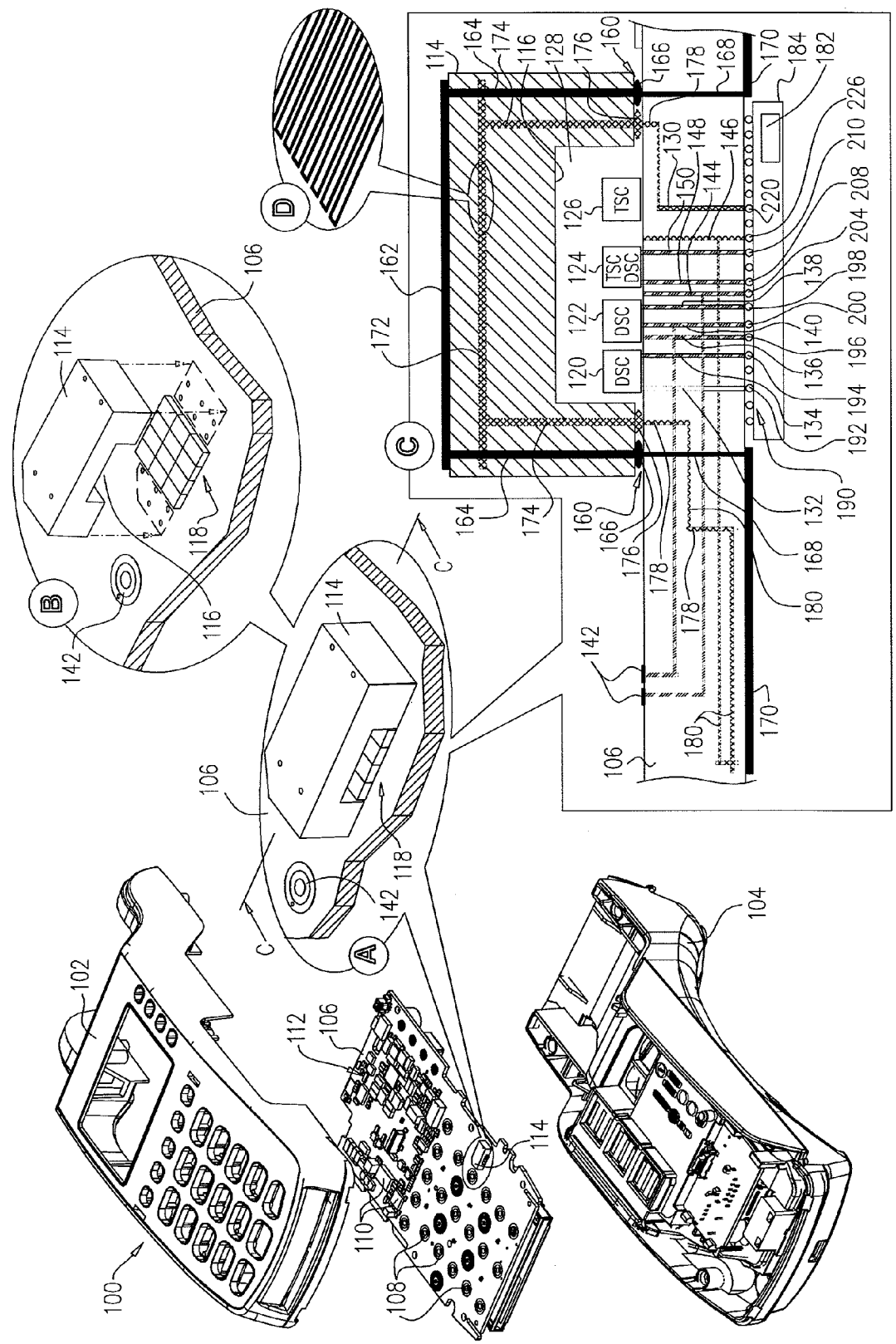

TAMPER SECURE CIRCUITRY ESPECIALLY FOR POINT OF SALE TERMINAL

REFERENCE TO RELATED APPLICATIONS

The following patents and patent applications are believed to be related to the present application and their disclosures are hereby incorporated by reference:

U.S. Pat. Nos. 6,853,093; 7,497,378; 7,784,691; 6,646,565;

U.S. Published Patent Application Nos. 2008/0180245; 2009/0058628 and 2009/0184850;

U.S. patent application Ser. Nos. 12/758,150 and 12/837,192;

GB2411756; EP1421549 and EP1676182; and

Published PCT Patent Application WO 2010/082190.

FIELD OF THE INVENTION

The present invention relates to tamper secure circuitry generally.

BACKGROUND OF THE INVENTION

The following patent publications are believed to represent the current state of the art:

U.S. Pat. Nos. 6,853,093; 7,497,378; 7,784,691; 6,646,565;

U.S. Published Patent Application Nos. 2008/0180245; 2009/0058628 and 2009/0184850; and GB2411756; EP1421549 and EP1676182.

SUMMARY OF THE INVENTION

The present invention seeks to provide improved tamper secure circuitry.

There is thus provided in accordance with a preferred embodiment of the present invention tamper secure circuitry including a first printed circuit board having mounted thereon circuit components and a slotted anti-tamper grid containing printed circuit board mounted onto the first printed circuit board defining at least one slot and arranged to overlie at least some of the circuit components, which are located in a volume defined by the at least one slot and the first printed circuit board.

Preferably, the circuit components mounted onto the first printed circuit board underlying the slotted anti-tamper grid containing printed circuit board include tamper sensitive circuit components. Additionally, the first printed circuit board is a multilayer printed circuit board and includes tamper sensitive vias which underlie the volume.

In accordance with a preferred embodiment of the present invention at least some of the circuit components which are located in the volume overlie at least some of the tamper sensitive vias which underlie the volume. Additionally, at least some of the circuit components which are located in the volume and overlie at least some of the tamper sensitive vias are tamper sensitive components. Preferably, at least some of the circuit components which are located in the volume and overlie at least some of the tamper sensitive vias are not tamper sensitive components.

In accordance with a preferred embodiment of the present invention the circuit components mounted onto the first printed circuit board underlying the slotted anti-tamper grid containing printed circuit board include data security critical circuit components.

Preferably, the first printed circuit board is a multilayer printed circuit board and includes data security critical vias which underlie the volume. Additionally, at least some of the circuit components which are located in the volume overlie at least some of the data security critical vias which underlie the volume. Preferably, at least some of the circuit components which are located in the volume and overlie at least some of the data security critical vias are tamper sensitive components. Preferably, at least some of the circuit components which are located in the volume and overlie at least some of the data security critical vias are not tamper sensitive components.

In accordance with a preferred embodiment of the present invention the circuit components mounted onto the first printed circuit board underlying the slotted anti-tamper grid containing printed circuit board include tamper sensitive and data security critical circuit components.

Preferably, the first printed circuit board is a multilayer printed circuit board and includes tamper sensitive and data security critical vias which underlie the volume. Additionally, at least some of the circuit components which are located in the volume overlie at least some of the tamper sensitive and data security critical vias which underlie the volume. Preferably, at least some of the circuit components which are located in the volume and overlie at least some of the tamper sensitive and data security critical vias are tamper sensitive components. Preferably, at least some of the circuit components which are located in the volume and overlie at least some of the data security critical vias are not tamper sensitive components.

BRIEF DESCRIPTION OF THE DRAWINGS

The present invention will be understood and appreciated more fully from the following detailed description, taken in conjunction with the drawing in which:

FIG. 1 is a simplified partially pictorial, partially sectional, partial illustration of a point of sale device including tamper secure circuitry constructed and operative in accordance with a preferred embodiment of the present invention.

DETAILED DESCRIPTION OF A PREFERRED EMBODIMENT

Reference is now made to FIG. 1, which is a simplified partially pictorial, partially sectional, partial illustration of a point of sale device including tamper secure circuitry constructed and operative in accordance with a preferred embodiment of the present invention.

As seen in FIG. 1, there is provided a point of sale device 100, such as a point of sale device having an overall configuration and functionality similar to that of a VX 520, commercially available from Verifone Inc. The point of sale device 100 typically includes a housing defined by top and bottom housing portions 102 and 104 respectively, which enclose a printed circuit board 106 on which Personal Identification Number (PIN) keypads 108 are mounted. Printed circuit board 106 preferably also includes various circuit components, generally designated by reference numeral 110. One or more additional printed circuit boards are also mounted within the housing and typically include a printed circuit board 112 on which is formed a protected enclosure, such as described in assignee's U.S. Pat. No. 6,853,093, the disclosure of which is hereby incorporated by reference.

In accordance with a preferred embodiment of the present invention, there is provided on a printed circuit board, here printed circuit board 106, a slotted, anti-tamper grid containing, protective printed circuit board 114, which is mounted onto printed circuit board 106 and defines at least one slot 116. Slot 116 is arranged to overlie and protect from tampering at least some circuit components, generally designated by reference numeral 118, including circuit components, such as a Surface Mount Technology (SMT) resistor 120, an SMT capacitor 122 and integrated circuits 124 and 126, which are located in a volume 128 defined by slot 116 and by printed circuit board 106.

It is appreciated that, although in the illustrated embodiment shown in FIG. 1 circuit components 118 are uniform in size, circuit components 118 need not be uniform in size and may include any suitable circuit components.

Preferably some or all of circuit components 118 are data security critical circuit components and/or tamper-sensitive circuit components. The term "data security-critical" is defined for the purposes of the present application as containing or carrying security-critical data, such as PIN codes, access codes, or personal identity information. The term "tamper-sensitive" is defined for the purposes of the present application as being responsive to tampering. SMT resistor 120 and SMT capacitor 122 are examples of such data security critical circuit components and integrated circuits 124 and 126 are examples of a tamper-sensitive circuit components. Integrated circuit 124 may also be a data security critical circuit component.

As seen in pictorial enlargement A, pictorial enlargement B and in further sectional enlargement C, taken along the lines C-C in pictorial enlargement A, preferably, printed circuit board 106 is a multilayer printed circuit board and includes at least one tamper-sensitive via 130 which underlies volume 128.

In accordance with a preferred embodiment of the present invention, at least one of the circuit components 118 which are located in volume 128, defined by slot 116 and printed circuit board 106, overlies tamper-sensitive via 130, which underlies volume 128.

Additionally in accordance with a preferred embodiment of the present invention, at least one of the circuit components 118, located in volume 128 which overlies tamper-sensitive via 130, is a tamper-sensitive component, such as integrated circuit 126, which is not operatively connected to tamper-sensitive via 130.

Additionally in accordance with a preferred embodiment of the present invention, a data security critical circuit component, such as SMT resistor 120, located in volume 128, overlies a non secure via 132 and a data security critical via 134 and is operatively connected thereto. Preferably, for enhanced security, the non secure via 132 is closer to the exterior of the protective printed circuit board 114 than the data security critical via 134.

Further in accordance with a preferred embodiment of the present invention, at least one of the circuit components 118 mounted onto printed circuit board 106 underlying the slotted anti-tamper grid containing printed circuit board 114 is a data security critical circuit component, such as SMT capacitor 122. Data security critical SMT capacitor 122 is connected to and overlies data security critical vias 136 and 138 and may also overlie but not be connected to any type of via, whether or not data security critical or tamper-sensitive. In the illustrated embodiment, SMT capacitor 122 overlies but is not connected to a data security critical via 140, which is connected to a PIN keypad 108, here designated as keypad 142. PIN keypad 142 is also connected to a data security critical via 144.

In the illustrated example data security critical via 144 underlies volume 128 but does not underlie a circuit component mounted therein.

Also, in the illustrated example a tamper-sensitive via 146 underlies volume 128 but does not underlie a circuit component mounted therein.

Additionally in accordance with a preferred embodiment of the present invention, a tamper sensitive component, such as integrated circuit 124, which is also a data security critical circuit component, overlies data security critical vias 148 and 150 which may or may not be operatively connected thereto.

Alternatively circuit components 118 within volume 128 which overlie data security critical vias or tamper-sensitive vias may be neither data security critical components nor tamper-sensitive components.

As a further alternative, circuit components 118 within volume 128 which overlie data security critical vias or tamper-sensitive vias may be both data security critical and tamper-sensitive.

As seen in FIG. 1, the slotted, anti-tamper grid containing, printed circuit board 114 preferably is mounted on printed circuit board 106 by a ball grid array (BGA) type connection, designated generally by reference numeral 160. In accordance with a preferred embodiment of the present invention, the slotted, anti-tamper grid containing, printed circuit board 114 is formed with a ground plane 162 at its top which is coupled via grounding vias 164, balls 166 of the ball grid array connection 160, and grounding vias 168 extending through printed circuit board 106 to a ground plane 170 of printed circuit board 106.

In accordance with a preferred embodiment of the present invention, a tamper sensitive grid 172 is formed in the slotted, anti-tamper grid containing, printed circuit board 114 typically below ground plane 162. A typical configuration of tamper-sensitive grid is shown in enlargement D and typically comprises a plurality of conductors which are in extremely close propinquity, such that any physical tampering with them creates either a short circuit or a circuit break.

Tamper-sensitive grid 172 is preferably coupled via tamper-sensitive vias 174, balls 176 of the ball grid array connection 160 and tamper-sensitive connections 178, which include via 130, and additional tamper-sensitive grids 180 formed in printed circuit board 106, to tamper detection circuitry 182, which is preferable embodied in a secured integrated circuit 184, which typically has various additional functions aside from tamper sensing. Secured integrated circuit 184 is preferably connected to an underside of printed circuit board 106 by means of a ball grid array (BGA) type connection 190. Secured integrated circuit 184 is characterized in that it includes integral anti-tamper protection.

Balls 192, 194, 196, 198, 200, 204, 208 and 210 of the ball grid array connection 190 provide connections between respective vias 132, 134, 136, 138, 140, 144, 148 and 150 and secured integrated circuit 184. Ball 192 is preferably connected to ground.

Balls 220 and 226 of the ball grid array connection 190 provide connections between respective tamper-sensitive vias 130 and 146 and secured integrated circuit 184.

Tamper detection circuitry 182 preferably is operative in response to sensed tampering with any of the tamper-sensitive components or vias to provide a suitable tamper response. The tamper response is typically one or more of the following: an audio and/or visual alarm, a remote alarm indication, disabling of functionality of all or part of the circuitry and erasing or deleting all or part of information contained in a memory.

It is a particular feature of the present invention that the protective structure described hereinabove provides credible anti-tamper protection for through hole vias, such as vias 132, 134, 136, 138, 140, 144, 146, 148 and 150, which are significantly less costly than vias which do not extend entirely through a printed circuit board and are inherently less vulnerable to tampering.

It is a particular feature of the present invention that credible anti-tamper protection is afforded to data-critical vias associated with PIN keypads 108, such as vias 140 and 144, by the protective structure of the present invention as described above.

It is a particular feature of the present invention that the slotted, anti-tamper grid containing, printed circuit board 114 may be placed at any suitable location on a printed circuit board where data critical components are present and thus often obviates the need to route critical data to a central protected location. Elimination of such routing enhances security of the data as well as signal quality due to reduced signal path lengths. An example applicable to the illustrated embodiment is placement of a slotted, anti-tamper grid containing, printed circuit board 114 at a location adjacent a card reading head, whose output is data critical.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. Tamper secure circuitry comprising:
    a first printed circuit board having mounted thereon circuit components; and
    a slotted anti-tamper grid containing printed circuit board mounted onto said first printed circuit board defining at least one slot and arranged to overlie at least some of said circuit components, which are located in a volume defined by said at least one slot and said first printed circuit board,
    said first printed circuit board being a multilayer printed circuit board and including tamper sensitive vias which directly underlie the bounds of said volume,
    said tamper sensitive vias being through hole vias.

2. Tamper secure circuitry according to claim 1 and wherein said circuit components mounted onto said first printed circuit board underlying said slotted anti-tamper grid containing printed circuit board include tamper sensitive circuit components.

3. Tamper secure circuitry according to claim 2 and wherein at least some of said circuit components which are located in said volume overlie at least some of said tamper sensitive vias which underlie said volume.

4. Tamper secure circuitry according to claim 3 and wherein at least some of said circuit components which are located in said volume and overlie at least some of said tamper sensitive vias are tamper sensitive components.

5. Tamper secure circuitry according to claim 4 and wherein at least some of said circuit components which are located in said volume and overlie at least some of said tamper sensitive vias are not tamper sensitive components.

6. Tamper secure circuitry according to claim 1 and wherein at least some of said circuit components which are located in said volume overlie at least some of said tamper sensitive vias which underlie said volume.

7. Tamper secure circuitry according to claim 6 and wherein at least some of said circuit components which are located in said volume and overlie at least some of said tamper sensitive vias are tamper sensitive components.

8. Tamper secure circuitry according to claim 7 and wherein at least some of said circuit components which are located in said volume and overlie at least some of said tamper sensitive vias are not tamper sensitive components.

9. Tamper secure circuitry according to claim 1 and wherein said circuit components mounted onto said first printed circuit board underlying said slotted anti-tamper grid containing printed circuit board include data security critical circuit components.

10. Tamper secure circuitry according to claim 9 and wherein said first printed circuit board also includes data security critical vias which underlie said volume.

11. Tamper secure circuitry according to claim 10 and wherein at least some of said circuit components which are located in said volume overlie at least some of said data security critical vias which underlie said volume.

12. Tamper secure circuitry according to claim 11 and wherein at least some of said circuit components which are located in said volume and overlie at least some of said data security critical vias are tamper sensitive components.

13. Tamper secure circuitry according to claim 11 and wherein at least some of said circuit components which are located in said volume and overlie at least some of said data security critical vias are not tamper sensitive components.

14. Tamper secure circuitry according to claim 1 and wherein said first printed circuit board also includes data security critical vias which underlie said volume.

15. Tamper secure circuitry according to claim 14 and wherein at least some of said circuit components which are located in said volume overlie at least some of said data security critical vias which underlie said volume.

16. Tamper secure circuitry according to claim 15 and wherein at least some of said circuit components which are located in said volume and overlie at least some of said data security critical vias are tamper sensitive components.

17. Tamper secure circuitry according to claim 15 and wherein at least some of said circuit components which are located in said volume and overlie at least some of said data security critical vias are not tamper sensitive components.

18. Tamper secure circuitry according to claim 1 and wherein said circuit components mounted onto said first printed circuit board underlying said slotted anti-tamper grid containing printed circuit board include tamper sensitive and data security critical circuit components.

19. Tamper secure circuitry according to claim 18 and wherein said first printed circuit board also includes data security critical vias which underlie said volume.

20. Tamper secure circuitry according to claim 19 and wherein at least some of said circuit components which are located in said volume overlie at least some of said tamper sensitive and data security critical vias which underlie said volume.

21. Tamper secure circuitry according to claim 20 and wherein at least some of said circuit components which are located in said volume and overlie at least some of said tamper sensitive and data security critical vias are tamper sensitive components.

22. Tamper secure circuitry according to claim 20 and wherein at least some of said circuit components which are located in said volume and overlie at least some of said data security critical vias are not tamper sensitive components.

23. Tamper secure circuitry according to claim 1 and wherein said first printed circuit board also includes data security critical vias which underlie said volume.

24. Tamper secure circuitry according to claim 23 and wherein at least some of said circuit components which are located in said volume overlie at least some of said tamper sensitive and data security critical vias which underlie said volume.

25. Tamper secure circuitry according to claim 24 and wherein at least some of said circuit components which are located in said volume and overlie at least some of said data security critical vias are tamper sensitive components.

26. Tamper secure circuitry according to claim 24 and wherein at least some of said circuit components which are located in said volume and overlie at least some of said data security critical vias are not tamper sensitive components.

27. Tamper secure circuitry according to claim 1 and also including a secured integrated circuit underlying a portion of said first printed circuit board which underlies said volume.

28. Tamper secure circuitry according to claim 27 and wherein said through hole vias are connected to said secured integrated circuit underlying a portion of said first printed circuit board which underlies said volume.

29. Tamper secure circuitry according to claim 1 and wherein said secured integrated circuit is a tamper sensitive integrated circuit.

* * * * *